United States Patent [19]
Muise et al.

[11] Patent Number: 6,072,248
[45] Date of Patent: Jun. 6, 2000

[54] METHOD OF AND SYSTEM FOR EXTERNALLY AND REMOTELY DISABLING STOLEN OR UNAUTHORIZED OPERATED VEHICLES BY PURSUING POLICE AND THE LIKE

[76] Inventors: Christopher Russel Muise, 26 Campmeeting Rd., Topsfield, Mass. 01983; Daniel Grant Thomas, 360 Winter St., North Andover, Mass. 01845

[21] Appl. No.: 09/129,734

[22] Filed: Aug. 5, 1998

[51] Int. Cl.[7] .................................................. B60R 25/04
[52] U.S. Cl. .................... 307/10.2; 180/287; 340/825.72
[58] Field of Search ..................... 180/287, 114; 307/10.1, 10.2, 10.3–10.6; 340/426, 425.5, 825.06, 825.69, 825.72, 825.3–825.32, 825.34, 901, 902, 904; 342/44; 123/333, 198 DB

[56] References Cited

U.S. PATENT DOCUMENTS

| | | | |
|---|---|---|---|
| 4,878,050 | 10/1989 | Kelley | 340/426 |
| 5,559,491 | 9/1996 | Stadler | 340/426 |
| 5,861,799 | 1/1999 | Szwed | 307/10.2 |

*Primary Examiner*—Richard T. Elms
*Attorney, Agent, or Firm*—Rines and Rines

[57] ABSTRACT

A method of and system for enabling pursuing police cruisers or the like to remotely and safely stop the engine of an appropriately equipped stolen or improperly operated vehicle, wherein the cruiser transmits a control signal to a receiver pre-provided in the vehicle, to initiate, preferably through modified engine control modules, a forced and over-riding multiple-stage reduction in fuel supplied to the engine, first to slow down the vehicle below idling speed, and then to stall the engine by total fuel shut off.

20 Claims, 6 Drawing Sheets

METHOD OF AND SYSTEM FOR EXTERNALLY AND REMOTELY DISABLING STOLEN OR UNAUTHORIZED OPERATED VEHICLES BY PURSUING POLICE AND THE LIKE

The present invention relates to anti-theft techniques and systems for stopping the unauthorized use of automotive vehicles and other fuel-engine-driven apparatus and the like, being more particularly, though not exclusively, concerned with the very special problems, conditions and circumstances of enabling pursuing police, remotely and safely, automatically to disable the further operation of such vehicles.

BACKGROUND

The problem of reducing the theft of motor vehicles and the like has received great attention within recent years and by numerous and widely varied approaches.

The frustration with the consequences of dangerous high speed chases, many of which result in serious injuries, and often to innocent bystanders, has even engendered the use of a system commonly known as "stop sticks" that requires the police to get in front of the chased vehicle and place a line of spikes in its path. Aside from the clumsiness of this tactic and the obvious hazard to the police and public from the vehicle with flat tires hurling at them at a high rate of speed, new technology in tires has produced a line of tires that can run some fifty miles without air in them.

The dangers to police in their pursuit of stolen automobiles, as well as the danger to the stolen vehicles, property and the public occasioned by such pursuit, are unfortunately all too well known; but, until the present invention, largely without adequate solution. Police cars often receive radio-telephone information from other police cars or communications centers to vector then onto the course of stolen vehicles; and, in the highly successfully LoJack® System (U.S. Pat. No. 4,818,998), police cars track radio transponders hidden in appropriately equipped vehicles to locate them—and, if being operated, to pursue them.

Even once the police have stopped a vehicle, however, they are still subject to the serious risk that the operator can speed off again, often running them down or even shooting the officer in so escaping.

The thrust of the approach underlying the present invention quite differently resides in the use of radiation signal transmissions (radio, light, infrared, etc.) externally to control the further unauthorized operation of appropriately receiver-equipped vehicles by remotely automatically disabling the operation of the vehicle engines in response to the reception of such transmissions.

It has previously been proposed, as, for example, in U.S. Pat. No. 5,453,730, remotely to control the unauthorized use of a vehicle by transmitting a radiation signal to a receiver disposed in that vehicle in order to initiate a warning to the unauthorized driver, as by illuminating the brake and hazard lights, that, within a short time, the fuel to the fuel pump will be automatically shut-off, as by the operation of a triggered centrifugal switch also responsive to the received signal and activated after the short time delay period.

A myriad of other anti-theft proposals of this and similar character involving transmitting signals to de-activate power or control circuits in the vehicle to disable the same have also been proposed, including those of U.S. Pat. Nos. 5,307,048; 5,417,090; 5,486,806; 5,477,090; 5,506,562; 5,563,453; 5,652,564; 5,608,272; 5,623,245; and 5,729,192. These approaches, moreover, require the vehicle owners to engage the system to have it operated.

While useful in varying degrees for the vehicle owner to try to protect the unauthorized operation of the owner's vehicle, these and other prior suggestions, however, fall far short of providing effective systems for the specific problems and applications underlying the present invention; namely, for use by pursuing or tracking police vehicles— and, in that connection, not only enabling fool-proof remote disabling of the unauthorized operating vehicle, but to do so in controlled stages, and thus with controlled safety to other vehicles in the area, to property and to pedestrians, to the pursuing police officers and their vehicles, and to the unauthorized vehicle operator himself or herself.

In accordance with the present invention, these problems are admirably solved in vehicles equipped with special anti-theft receivers and control circuits that enable pursuing police cars that have been provided with a special radiation transmitter, for remotely directing signals from the pursuing police car towards the fleeing vehicle, effectively, safely and automatically to disable the engine of that vehicle in stages of speed reduction or slow-down. This is a vital safety feature, allowing the police to select a safe spot, away from the general public, for fully stopping the vehicle, and for avoiding the consequences of an abrupt stop.

OBJECTS OF INVENTION

A primary object of the invention, accordingly, is to provide a new and improved method of and system for externally and remotely automatically disabling stolen or unauthorized operated vehicles or the like by pursuing police or other parties, that, unlike prior art signal-controlled engine disabling systems as in the above-cited patents, particularly address the special and unique circumstances of stolen vehicle pursuit by police cars and the like, and enable such remote automatic disablement effectively and safely in staged slow-down.

A further object is to provide such a novel system that can be adapted for use with both older engines using carburetors, more modern engines employing fuel injection, and, more recently, such engines operating with electronic computerized engine control and management modules (hereinafter sometimes abbreviated "ECM"), with applicability either as accessory after-market equipment, or as original manufactured equipment (OEM).

Still another object is to provide this improved technique for remotely controlling and/or disabling fuel-driven engines, of more general use, as well.

Other and further objects will be explained hereinafter and are delineated in the appended claims.

SUMMARY

In summary, however, from one of its important viewpoints, the invention embraces a method of remotely and safely automatically stopping a fuel-driven engine of a vehicle equipped with a receiver responsive to an externally transmitted signal, that comprises, transmitting the signal to the vehicle-to-be-stopped; upon receipt of the signal by the receiver at the vehicle, and in response thereto, initiating in the vehicle a forced multiple-stage successive reduction in fuel supply to the engine; first, to a stage of slow down of the vehicle, and then to stall the engine completely in response to a final stage of total fuel shut-off.

The invention is designed to allow law enforcement officers remotely to slow down an equipped fleeing vehicle with safety, and then to stop the vehicle that they are chasing. This is accomplished by the transmittal of a signal from the pursuing police vehicle that first slows and then stops the engine of a vehicle equipped with the appropriate receiver and apparatus of the invention. This enables the law enforcement officer safely to stop a high speed pursuit. The system consists of two main components. First, a receiver system mounted in a vehicle electric system that is to affect the fuel system; and secondly, a signal transmitter controlled by the law enforcement officer.

Preferred and best mode designs and details will later be described.

DRAWINGS

The invention will now be exemplarily described with reference to the accompanying drawings.

PREFERRED EMBODIMENT(S) OF INVENTION

Figure 1:
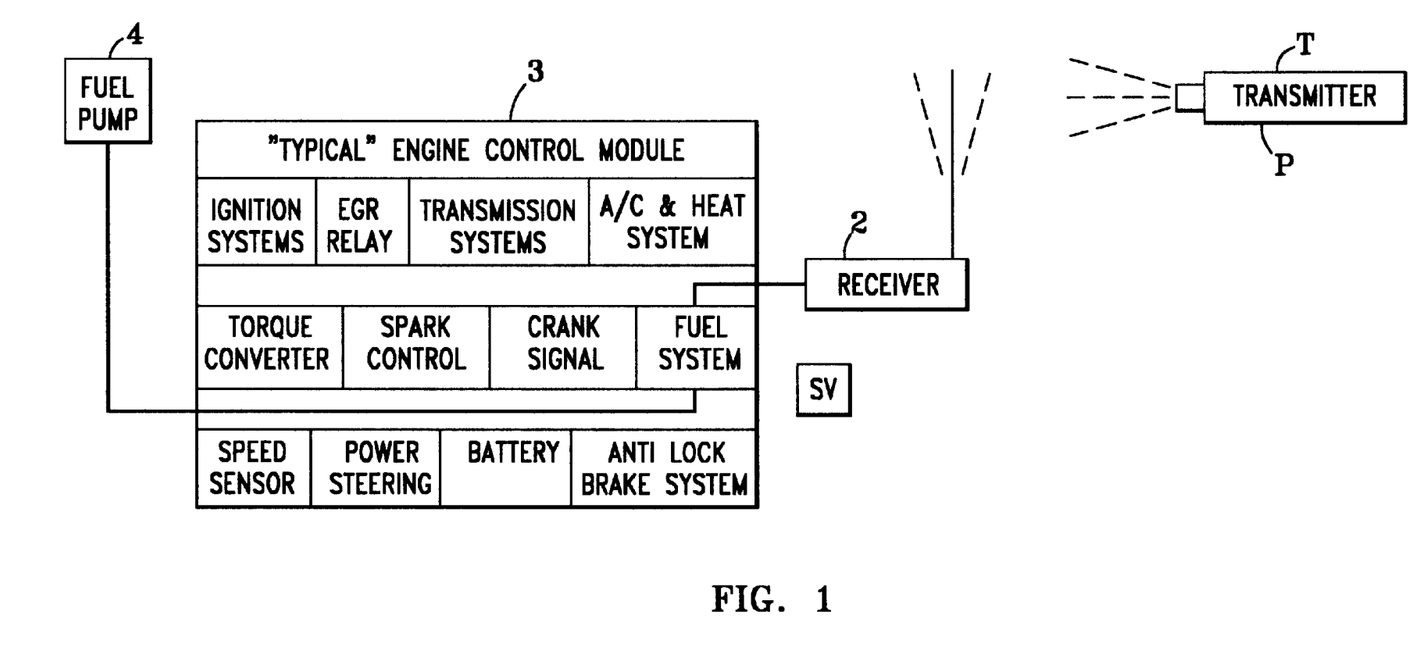
FIG. 1 of which is a block diagram illustrating the technique and system of the invention as used, in preferred form, with vehicles equipped with engine control modules (ECM) modified to incorporate the invention.

Referring, first, to FIG. 1, an appropriate radio, laser or other radiant energy transmitter is shown at 1, as provided on a police cruiser vehicle P (FIG. 4C) sending signals T to a fleeing stolen vehicle SV that has been pre-equipped by the owner with a corresponding signal receiver module 2 in addition to the usual engine control module 3 (ECM) that controls the engine operational functions, including the fuel pump system 4, in conventional fashion. Of particular interest for purposes of the present invention, is the "fuel system control" of the ECM, so-labeled, that controls the fuel pump 4. In accordance with the present invention in one preferred mode, the reception of the police transmission T in the receiver 2 causes a signal to be applied at 5 to the fuel control section of the ECM 3, more fully later discussed in connection with FIG. 3, to command the fuel system to lower the engine speed in successive steps at spaced intervals of time. First, preferably to a speed near or preferably below idle condition, providing a first stage of forced vehicle slow-down, involuntary to the vehicle operator; and then, a second stage of total shut-down of the fuel pump 4 (or, if desired, further intermediate slower engine speed step or stages in between).

Figure 3:
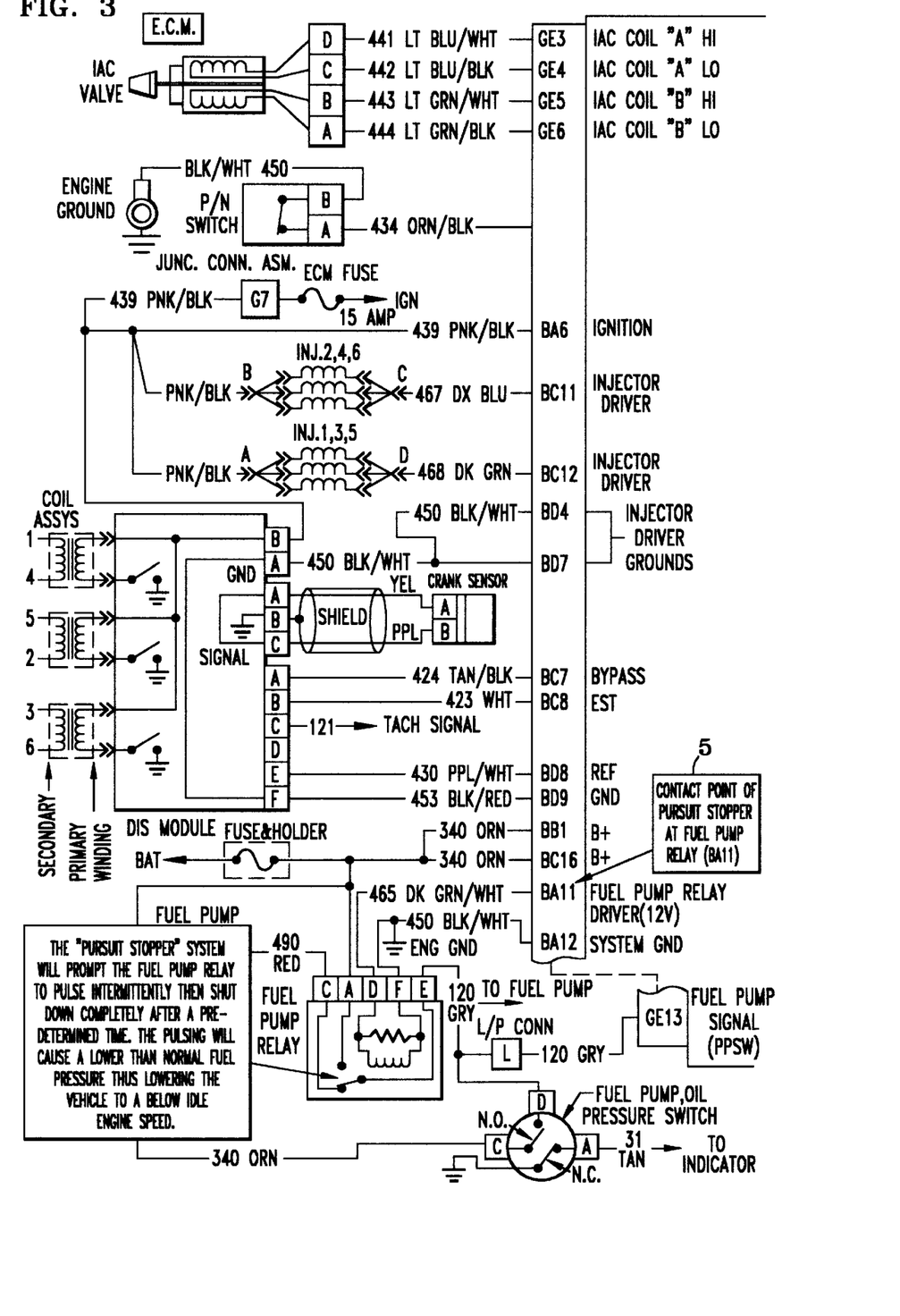
FIG. 3 is a schematic circuit diagram of an ECM adapted, as in the embodiment of FIG. 1, for remote engine disablement.

More specifically, the "fuel system control" section of the engine control module ECM 3 of FIG. 1 (a typical General Motors design), is shown in FIG. 3 as comprising a fuel pump relay, so-labeled at the bottom of the drawing, which controls the fuel pump in well-known conventional fashion. In accordance with the invention, the signal from the receiver 2 is applied at 5 to cause the fuel pump relay to chatter or pulse intermittently, causing a lower than normal fuel pressure to be instituted and lowering the vehicle speed to below idle engine speed—this constituting the first stage or forced slow-down step before discussed. After a predetermined time, the relay may automatically close (or a further transmission from the police transmitter under the control of the police may trigger the final closing), completely stalling and shutting down the engine—the second stage or step previously discussed. In effect, this achieves a staged valving off of the fuel supply.

For such OEM or factory installed versions of the invention, the receiver and control circuit modifications are embodied in a vehicle engine control module ECM at the time of original equipment manufacture. The system, when targeted by law enforcement, will command the fuel management system to lower or otherwise affect the vehicle fuel flow so as to slow the vehicle engine speed to a below idle condition. This results in a lower than normal idle speed regardless of throttle position, but still allows the vehicle operator to steer and stop the vehicle with the assistance of the power steering and brakes. The lower than normal idle speed stage only lasts a short predetermined amount of time, after which the fuel pump is shut down completely, stalling the engine. While the system may later be reset, until so reset, the vehicle will not be able to be started.

Figure 4A:
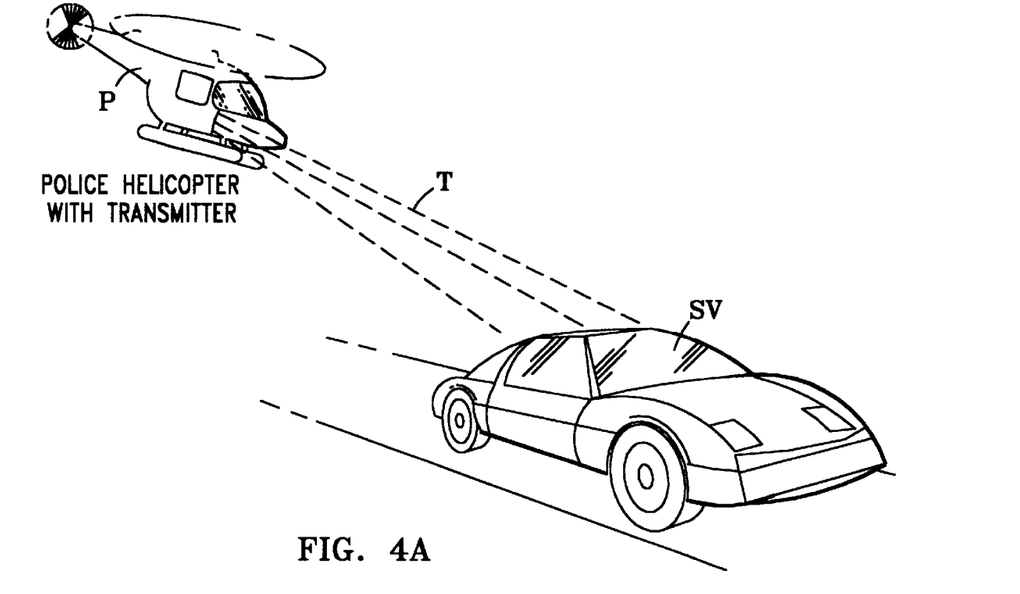
FIGS. 4A, 4B and 4C respectively illustrate use of the invention for helicopter, hand-held and pursing police cruiser use.
Figure 4B:
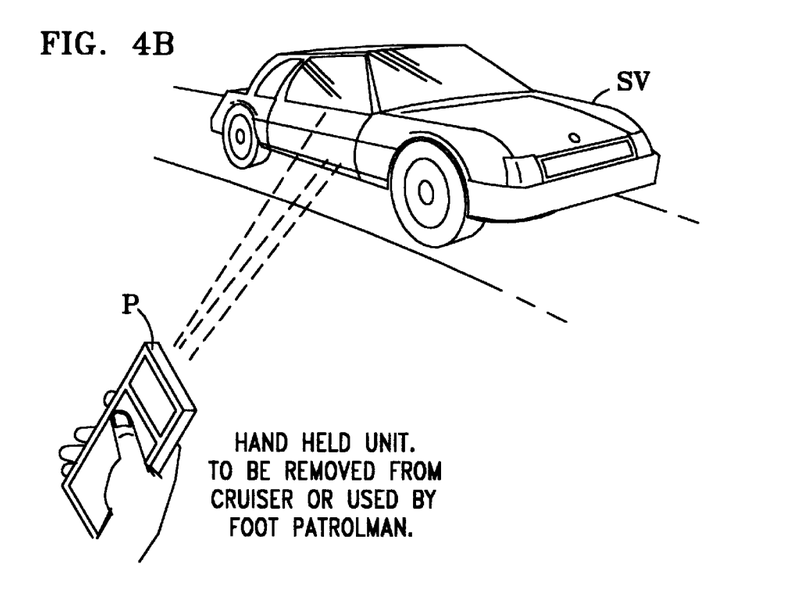
Figure 4C:
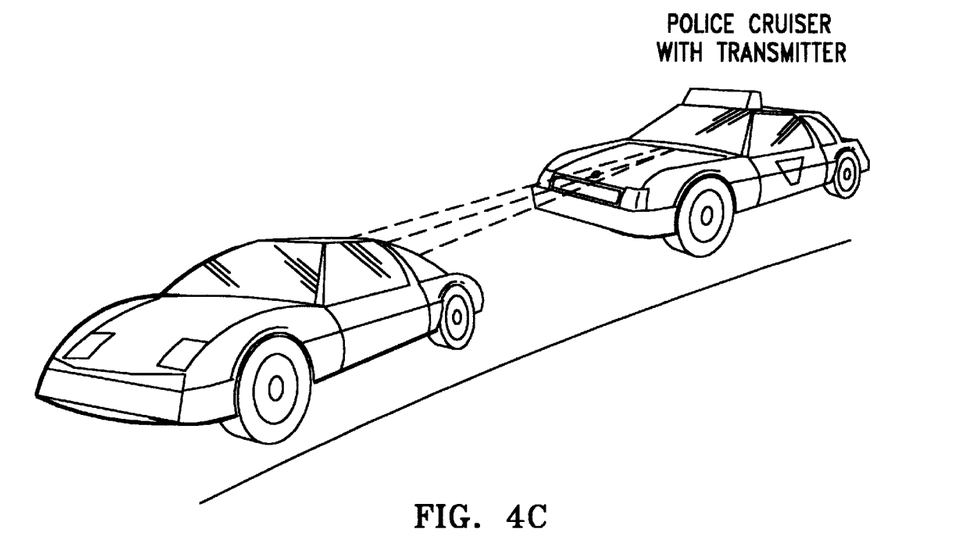

The transmitter 1 may be both hand held (FIG. 4B) or mountable into the law enforcement vehicles (FIG. 4C). The transmitter will preferably radiate a very narrow type of a directional beam so as to protect other vehicles on the road from being inadvertently affected. The transmission range will vary depending on the application. In a police cruiser, for example, as in FIG. 4C, a short range transmitter will be sufficient because the vast majority of high speed chases start when a law enforcement vehicle is directly behind the fleeing vehicle. With the transmitter mounted in a police aircraft, FIG. 4A, on the other hand, a higher strength transmitter would be more appropriate. The aircraft-mounted unit, indeed, would allow law enforcers to stop a high speed chase without the need for a police cruiser chasing at high speed.

Figure 2A:
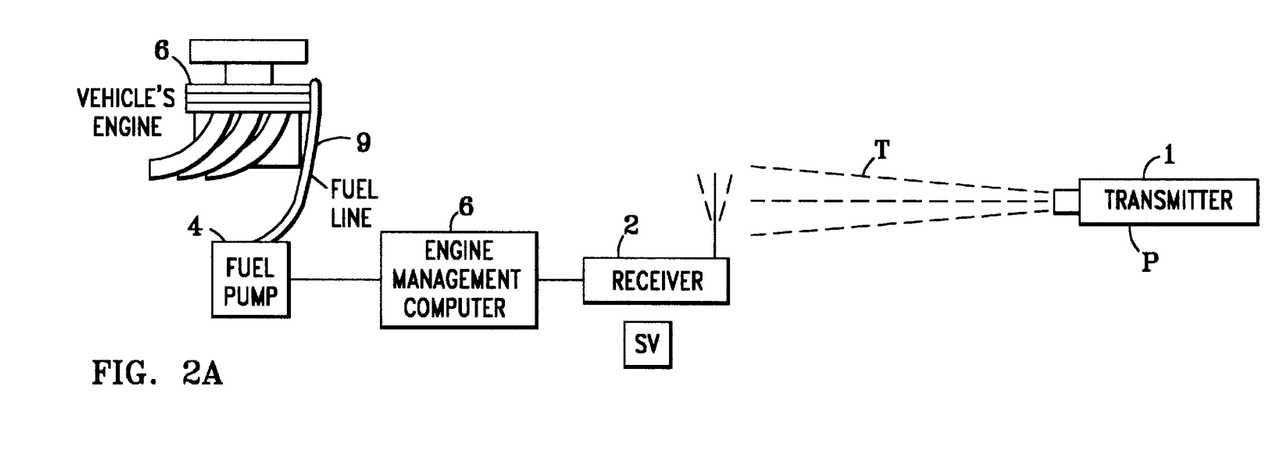
FIGS. 2A and 2B are schematic diagrams of the principles of the invention applied in alternate schemes to vehicles equipped with engine management computer modules, and FIG. 2C, to a vehicle not so equipped.
Figure 2B:
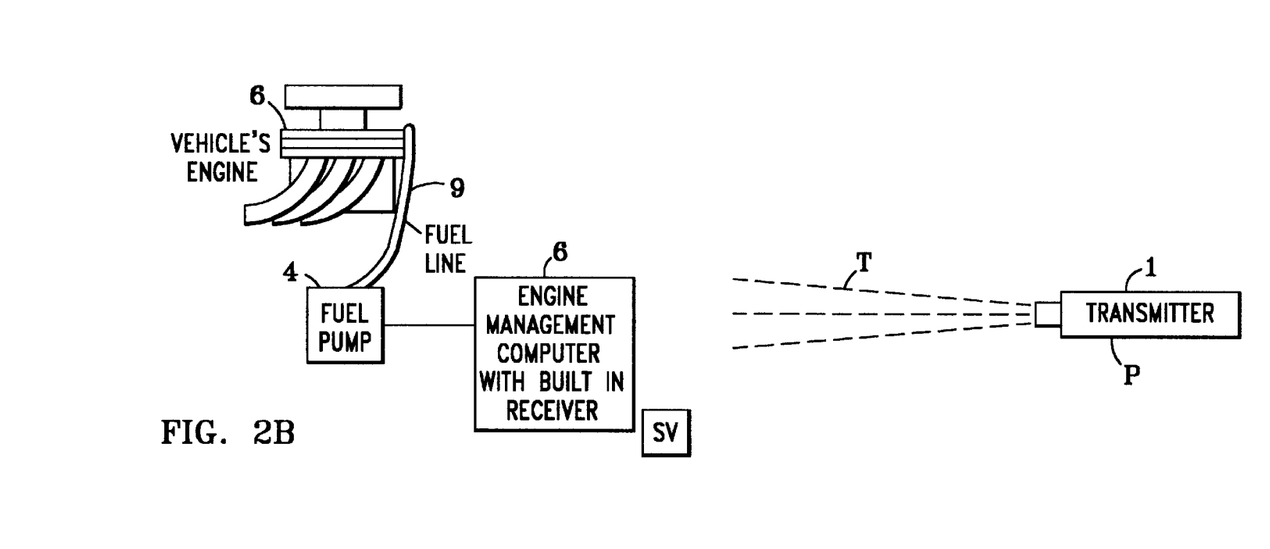

The receiver 2 provided in the vehicle seeking the protection of the invention, is shown as external to the ECM 3 or engine management computer 6, in FIGS. 1 and 2A, respectively. It may, however, be incorporated as a chip into the engine management computer as illustrated at 7 in FIG. 2B.

For the before-mentioned versions for the after market or retrofitting of existing vehicles, several forms are useful depending upon the type of vehicle and the application. The basic components, however, are a receiver controlling a two stage relay 2', FIG. 2C, and various types of connections. The receiver will be capable of receiving a signal identical to that of the OEM installations, FIG. 2B,. The two stage relay will have the same characteristics; first to pulse and then to close, effecting lower than normal idle speed and then complete fuel shut down from the fuel line 9 after a predetermined amount of time. The installation connections will be based on the specific type of vehicle, with a common connector at the fuse receptacle 8. The connector may also have a locking mechanism to prevent removal, once installed, and a block-out plate (not shown) that will eliminate the possibility of overriding the system by a thief.

In the case of a vehicle that has an older mechanical fuel pump system, such as one equipped with a carburetor instead of the more contemporary fuel injection type systems, the "PURSUIT STOPPER" system of the invention may be installed into the coil circuit, with power shut-off to the coil circuit stalling the engine. The two-stage relay in this application would cause the coil to lose power intermittently until total shut down occurs—the same characteristics as above described.

Figure 2C:
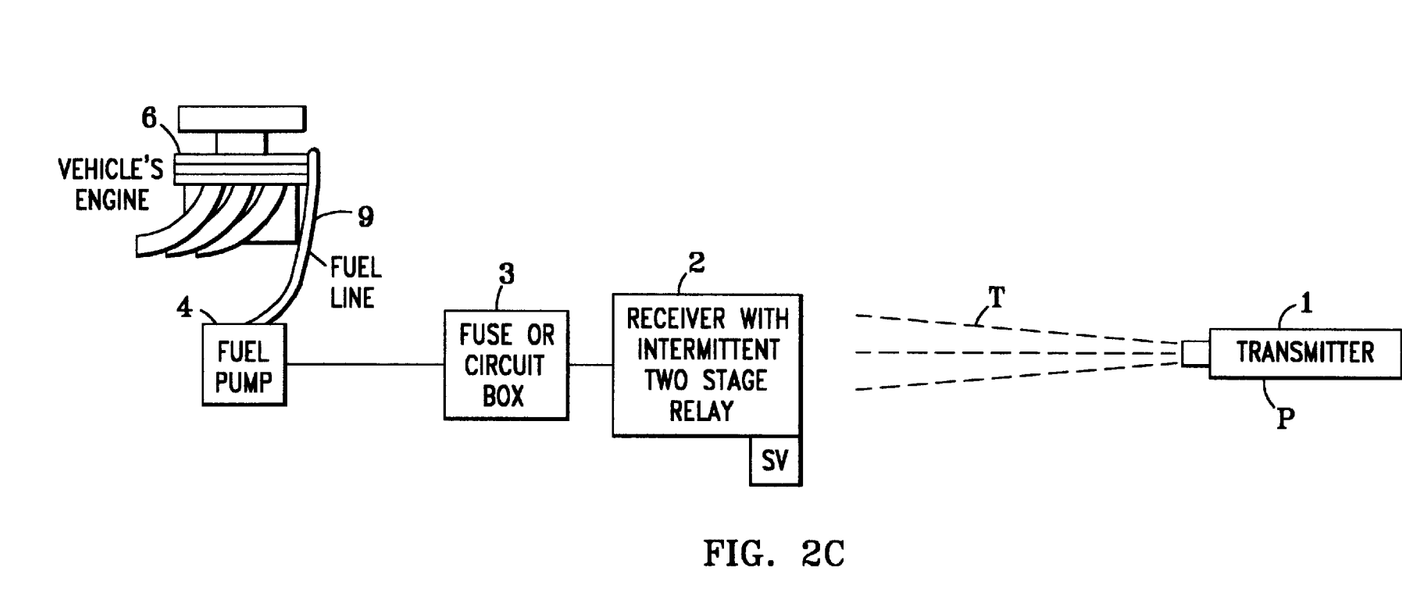
Figure 5:
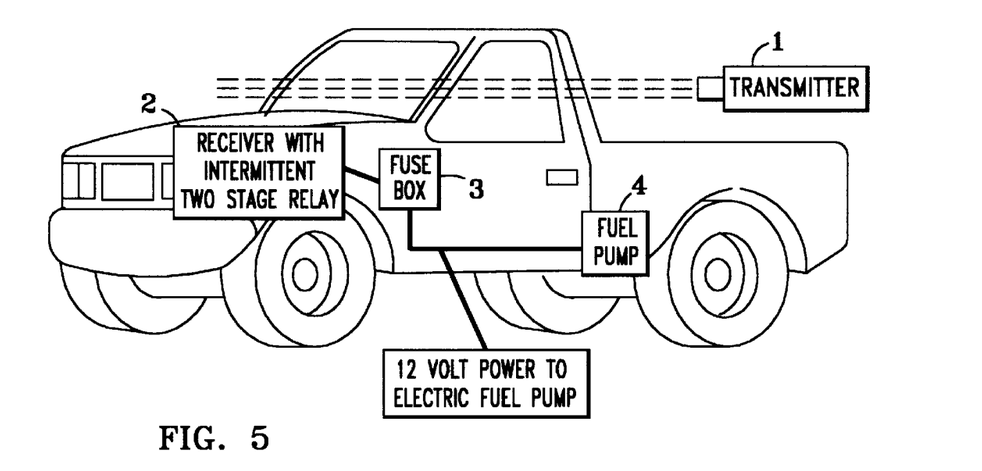
FIG. 5 is a diagram of a successfully operated prototype of the type shown in FIG. 2C.

A successfully operated version of the system of FIG. 2C is shown in the diagram of FIG. 5, using a transmitter 1 of the Linear Corp. Model 22-D single channel type, operating at a frequency of 303.875 MHz, a Linear Corp. D676-F type receiver 2 installed in the vehicle, a pulsing two-stage relay 2' of the type positive switching type paralleled with a Digit-Timer manufactured by SSAC Inc., and the shown connections to the fuse box 8 and fuel pump electric supply. The initial pulsing relay slow-down stage to below idling occurred in about 0.02 seconds, and the predetermined time period thereafter for the total shut-down stage was about 15 seconds.

Thus the invention, in all its forms, provides a simplified, but highly effective, system with minimal special equipment that enables pursing police cars remotely to control and ultimately safely shut off the fuel in a stolen vehicle or other errant vehicle—assuming the vehicle is equipped with an appropriate engine management system modification or appropriate ancillary circuits tailored for this present function (as pre-agreed by the vehicle owner to enable police recovery of the vehicle, if stolen, or as mandated by a legislature). The invention is particularly tailored for use by police car pursuit and to be initiated and remotely controlled by the police with maximum effectiveness and control in stopping the fleeing vehicle, and with safety to the surrounding public and property, to the police, and to the vehicle, as before explained.

Unlike prior proposals such as in some of the previously cited patents for giving illuminated or other audible warning in or to the stolen vehicle that a recovery pursuit is being initiated, the present invention relies on existing police car warning devices (sirens, horns, loud speakers, etc,) under the control and discretion of the police; and further unlike total cut-off of power or fuel by transmitted signals as in such prior proposals, the invention provides for a two (or more) stage or step-controlled forced slow down for a predetermined interval before total shut down of the engine operation.

In the preferred (OEM) version, the computer management system fuel pump control circuit (and/or idler control), as modified, is over-ridden upon the receipt in the vehicle of the police-cruiser radio, laser or other signal transmitted directionally from the cruiser right at the vehicle to avoid the possibility of receipt by other vehicles in the vicinity that may also be equipped with this receiving system. The vehicle receiver for this signal may be mounted in line-of-sight from the rear, front and sides of the vehicle, as on the top of the dashboard, hidden or disguised therein, and appropriately connected with or in the management processor unit as previously detailed. As before discussed, where there is no management system, as in older cars, a two (or more) stage valve shutoff may be installed to control the fuel line, also activatable by the received police transmission. As earlier stated, after vehicle recovery, a subsequent transmission from the police transmitter, such as a coded number of impulses, may reset the management system or multi-stage valve for resumption of operation.

Given the fact that the "PURSUIT STOPPER" of the invention is passive and silent, it will serve a multitude of purposes. Because it is passive, once installed into a vehicle, moreover, the vehicle owners do not have to engage the system, nor can they. If the operator of the vehicle is in some way physically impaired (heart attack, drug or alcohol intoxication), the police can safely slow down and then stop the vehicle. In the case of a vehicle theft, the police usually do not know what to expect from a car thief (bank robber, kidnapper, suicidal maniac, etc.).

There are, moreover, other applications where the technique of the present invention is also useful.

The remotely controlled staged engine shut-down of the invention, may, as an example, also be usefully applied to engines driving other types of systems, such as boats or the like; and, indeed, to the shut-down of fuel-driven engines of all kinds and in many uses or locations. Further modifications including, for example, other types of well-known multiple-stage or stepped control or valving than the particular illustrative type of relays herein described may also be used, and will be evident to those skilled in this art; and such are accordingly deemed to be embraced within the spirit and scope of the invention as defined in the appended claims.

What is claimed is:

1. A method of remotely and safely automatically stopping a fuel-driven engine of a vehicle equipped with a receiver responsive to an externally transmitted signal, that comprises, transmitting the signal to the vehicle-to-be-stopped; upon receipt of the signal by the receiver at the vehicle, and in response thereto, initiating in the vehicle a forced multiple-stage successive reduction in fuel supply to the engine; first, to a stage of slow down of the vehicle below normal engine idling speed, and then to stall the engine completely in response to a final stage of total fuel shut-off.

2. The method as claimed in claim 1 wherein the signal transmission is controlled by law enforcement personnel in pursuit of a misappropriated or improperly or dangerously operated vehicle, and the multiple-stage forced fuel reduction is timed by such personnel.

3. The method as claimed in claim 1 wherein the vehicle is equipped with fuel injection and an engine management computer or center having a fuel injection control component, and said initiating step is effected, upon receipt of the transmitted signal, by controlling the fuel control component, first to reduce the fuel available to the engine below the engine idling speed, and then subsequently to shut off all fuel, stalling the engine.

4. The method as claimed in claim 3 wherein the reducing of the fuel to the engine is effected initially by intermittently pulsing the operation of the fuel control component.

5. The method as claimed in claim 1 wherein the vehicle is equipped with a fuel pump system controlled by a carburetor and electrically powered, and said initiating step is effected, upon receipt of the transmitted signal, by intermittently supplying power to stage successive reductions in the electrical powering of the fuel pump to ultimate shut-down.

6. The method of claim 1 where said multiple-staged successive reduction in fuel supply to the engine is controlled by effectively staged valving of the fuel supply.

7. The method of claim 6 wherein an electrically powered relay controls a fuel pump for supplying the fuel to the engine, and said staged valving of the fuel supply to the engine is effected by intermittently pulsing the relay and then finally activating the relay to shut-off the pump.

8. The method claimed in claim 7 wherein after shut-down, the relay is re-set to enable normal fuel supply engine operation.

9. A system for remotely and safely stopping a vehicle fuel-driven engine controlled by a fuel supply pump and wherein the vehicle is also equipped with a receiver responsive to an externally transmitted signal, the system having, in combination with the receiver at the vehicle, a control circuit responsive to the receipt of the transmitted signal in the vehicle receiver connected thereupon to control the fuel pump to initiate a forced multiple-stage successive reduction in fuel supplied by the fuel pump to the engine; first, to the stage of slow down of the vehicle below normal engine idling speed, and later to the stage of shut-off of all fuel to the engine to stall the engine.

10. The system of claim 9 wherein said multiple-stage successive reduction in fuel supplied by the fuel pump to the engine is controlled by effectively staged valving of the fuel supply.

11. The system of claim 10 wherein said staged valving is effected with a fuel pump relay provided with a circuit responsive to the received signal for enabling the initial intermittent pulsing of the relay, and then, after a predetermined time, final activation to shut-off the pump.

12. The system of claim 9 wherein the vehicle is equipped with fuel injection and an engine management computer or center having a fuel injection control component, and a circuit responsive to the receipt of the transmitted signal in the vehicle receiver for thereupon controlling the fuel control component, first to reduce the fuel available to the engine below the engine idling speed, and then subsequently to shut off all fuel, stalling the engine.

13. The system of claim 12 wherein said circuit initially causes the intermittent pulsing operation of the fuel control component.

14. The system of claim 13 wherein the fuel pump is energized through a fuel pump relay, and the relay is initially intermittently pulsed and then finally activated to shut-off the pump.

15. The system of claim 9 wherein the vehicle is equipped with an electrically powered fuel pump system controlled by a carburetor, and, upon receipt of the receiver of the transmitted signal and in response thereto, said control circuit effects the intermittent supplying of power to the fuel pump system to stage successive reductions in the electrical powering of the fuel pump down to ultimate shut-down.

16. The system of claim 9 wherein the transmitted signal emanates from police or other enforcement personnel provided with a transmitter adapted to be operated by such personnel in pursuit of the vehicle as from a police vehicle, with the transmitter being activatable by such personnel at selected times.

17. A method of automatically shutting down a fuel-driven engine at a remote location which is equipped with a receiver responsive to an externally transmitted signal, that comprises, transmitting the signal to the remote location; upon receipt of the signal by the receiver and in response thereto, initiating at the remote location, a forced multiple-stage successive reduction in fuel supply to the engine; to a first stage of slow down of the engine below normal engine idling speed, and then to stalling the engine completely in response to a final stage of total fuel shut-off.

18. The method of claim 17 wherein the first stage involves reducing the fuel available to the engine to below engine idling speed, and then subsequently to the complete fuel shut-down stage.

19. The method of claim 17 wherein the initial stage reducing of the fuel supply is effected by intermittently pulsing the operation of the fuel supply to the engine in response to the received signal.

20. The method of claim 17, wherein, after shut-down, the fuel supply is reset and restored to enable normal engine operation.

* * * * *